United States Patent [19]

Tsuruoka et al.

[11] Patent Number: 4,979,159
[45] Date of Patent: Dec. 18, 1990

[54] METHOD OF RECORDING DATA ONTO AN OPTICAL CARD HAVING A PLURALITY OF TRACKS CONTAINING AT LEAST ONE ID SECTION, ERROR CORRECTING CODE OR DIRECTORY POINTER AREA AND METHOD OF REPRODUCING DATA THEREFROM

[75] Inventors: Yoshiaki Tsuruoka, Funabashi; Norikazu Saitou, Fuchu, both of Japan

[73] Assignee: Dai Nippon Insatsu Kabushiki Kaisha, Japan

[21] Appl. No.: 265,808

[22] PCT Filed: Feb. 12, 1988

[86] PCT No.: PCT/JP88/00141
§ 371 Date: Oct. 7, 1988
§ 102(e) Date: Oct. 7, 1988

[87] PCT Pub. No.: WO88/06339
PCT Pub. Date: Aug. 25, 1988

[30] Foreign Application Priority Data

Feb. 12, 1987 [JP] Japan ................................. 62-30582
Feb. 12, 1987 [JP] Japan ................................. 62-30584
Aug. 12, 1987 [JP] Japan ................................. 62-201367

[51] Int. Cl.⁵ .......................... G11B 5/80; G11B 7/00
[52] U.S. Cl. ..................................... 369/58; 235/454; 235/494
[58] Field of Search .............. 369/32, 33, 43-47, 369/53, 57, 58, 54, 109; 360/72.1, 72.2, 2; 235/454, 470, 487, 494

[56] References Cited

U.S. PATENT DOCUMENTS 4,849,956 7/1989 Aizawa ................................. 369/58
4,868,806 9/1989 Sakagami ............................. 369/58

Primary Examiner—Robert L. Richardson
Attorney, Agent, or Firm—Arnold, White & Durkee

[57] ABSTRACT

A large number of tracks (T) are formed on an optical card (200) and user data are recorded as pits on these tracks. By driving this optical card in a reciprocating manner in a direction parallel to the tracks, user data are reproduced. At both the end portions of each track, guide sections (G) in which no pit indicative of information is formed are provided, thus preventing errors in reading occurring at the time of acceleration and deceleration in the reciprocating drive. Identification information (I) for tracks is recorded at the inside portion adjacent to one guide section, and termination information (E) for tracks is recorded at the inside portion adjacent to the other guide section. User data (U) are recorded between the identification information and the termination information. User data is divided into groups comprised of a predetermined number of bits. Unit data blocks in which an error correcting code is added to every group are formed and these unit data blocks are recorded in a distributed manner on the optical card. On the optical card, a directory pointer area (212), a directory area (213) and a data area (214) are provided. Where there is an alteration in the directory on the basis of a change of the data area, a new directory is written into the directory area and at all times a directory pointer indicating the position of the newest directory is written into the directory pointer area.

13 Claims, 13 Drawing Sheets

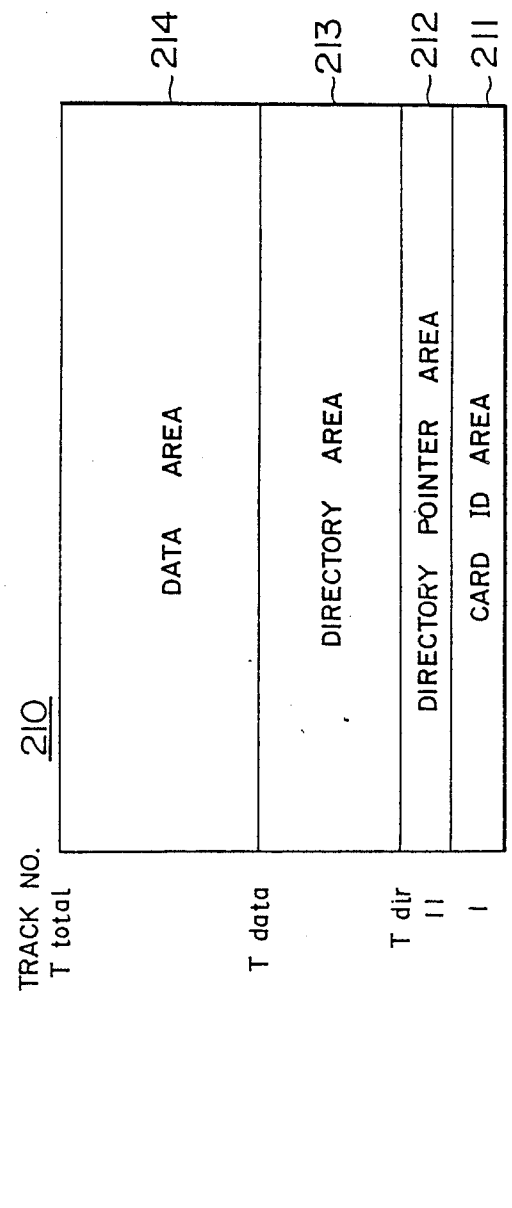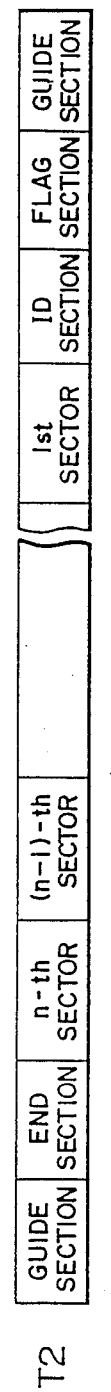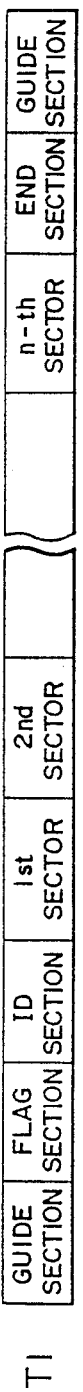
FIG. 7
FIG. 8

FIG. 9e

SECTOR: | GAP 4BYTES | SYNC 8BYTES | AM3 4BYTES | SECTOR NO 2BYTES | CRCC 2BYTES | SYNC ONE BYTE | IDLE ONE BYTE | DATA 512/4 BYTES |

FIG. 9f

SECTOR: | GAP 4BYTES | SYNC 7BYTES | AM3 4BYTES | TRACK NO 2BYTES | SECTOR NO ONE BYTE | CRCC 2BYTES | GAP 4BYTES | SYNC 7BYTES | IDLE ONE BYTE | DATA 512/4 BYTES | MG ONE BYTE |

FIG. 9g

END SECTION: | GAP 8/16 BYTES | AM4 4BYTES | SYNC 8BYTES | GAP 4BYTES |

GUIDE SECTION

FIG. 9b

FLAG SECTION

| GAP | SYNC | AM1 | SYNC | IDLE | FLAG |
|---|---|---|---|---|---|
| 4 BYTES | 8 BYTES | 4 BYTES | ONE BYTE | ONE BYTE | ONE BYTE |

FIG. 9c

ID SECTION

| GAP | SYNC | AM2 | TRACK NO | CRCC |
|---|---|---|---|---|
| 4 BYTES | 8 BYTES | 4 BYTES | 2 BYTES | 2 BYTES |

←―― REPEAT FIVE TIMES ――→

FIG. 9d

ID SECTION

| GAP | SYNC | AM2 | TRACK NO | CRCC | SYNC | JA |
|---|---|---|---|---|---|---|
| 4 BYTES | 7 BYTES | 4 BYTES | 2 BYTES | 2 BYTES | 7 BYTES | 20 BYTES |

←―――― REPEAT FIVE TIMES ――――→

DATA CONFIGURATION OF ONE TRACK IN CARD ID AREA, DIRECTORY AREA AND DATA AREA

DATA CONFIGURATION OF ONE TRACK IN DIRECTORY POINTER AREA

CARD ID AREA

| T total | T dir | T data | ECC |
|---|---|---|---|
| 2 BYTES | 2 BYTES | 2 BYTES | 15 BYTES |
| | | | 11 BYTES |

FIG. 11a

DIRECTORY POINTER AREA

| POINTER | ECC |
|---|---|
| 2 BYTES | 2 BYTES |

FIG. 11b

DIRECTORY AREA

| FILE NAME | ATTRIBUTE | TIME | DATE | CAPACITY | FIRST TRACK | ECC |
|---|---|---|---|---|---|---|
| 11 BYTES | ONE BYTE | 2 BYTES | 2 BYTES | 3 BYTES | 2 BYTES | 11 BYTES |

FIG. 11c1

| CON | SUCCEEDING TRACK | ECC |
|---|---|---|
| ONE BYTE | 20 BYTES | 11 BYTES |

FIG. 11c2

DATA AREA

| USER DATA | ECC |
|---|---|
| 21 BYTES | 11 BYTES |

METHOD OF RECORDING DATA ONTO AN OPTICAL CARD HAVING A PLURALITY OF TRACKS CONTAINING AT LEAST ONE ID SECTION, ERROR CORRECTING CODE OR DIRECTORY POINTER AREA AND METHOD OF REPRODUCING DATA THEREFROM

FIELD OF THE ART

This invention relates to a method of recording data onto an optical card and a method of reproducing them therefrom, and more particularly to an optimum format therefor.

BACKGROUND ART

As the present time is called a card age, cash cards, credit cards, and various other cards have appeared on the market. Most of them are magnetic recording cards and especially cards of the business card size, which are convenient to carry, are very often used. However, since recording capacity is not so much assured in magnetic recording cards of such a size, it is at the present state that they are only used to the extent of memorization of collation card, e.g., secret code, account number or registration number, etc. extremely restricted. In this respect, optical cards which optically record information have the merit that the information content recorded is far greater than that of conventional magnetic recording cards.

Such a system to record information onto an optical card and then to reproduce information therefrom is disclosed in, e.g., the Japanese Patent Application Laid-Open No. 137245/86 publication. In this system, a direction of laser beam is controlled by two servo control mirrors, thus to carry out scanning of recording areas on the optical card. Further, a method is disclosed in the Japanese Patent Application Laid-Open No. 40325/84 publication to effect recording and reproducing while vibrating a laser beam in a direction vertical to the scanning direction of the optical card, and an actual mechanism for a scanning laser beam is disclosed in the Japanese Patent Application Laid-Open No. 214239/86. In addition, a format for recording data onto an optical card with high efficiency is disclosed in the Application No. JP86/00134 specification under the Patent Cooperation Treaty.

However, problems with the recording format of conventional optical cards are as follows:

(1) For an optical disc, it is sufficient to carry out scanning with a laser beam by revolving the disc. In contrast, since it is necessary for an optical card to be scanned by a laser beam lengthwise and breadthwise, a peculiar format suitable for an access to tracks is required.

(2) The recording area on the surface of an optical card is likely to be subjected to adhesion of dust or scratched, with the result that reading error may occur at the time of reproduction or playback.

(3) File management is required for an optical card. Namely, every time the content of a file is altered or modified, or a new file is added, it is necessary to update the directory. In the case of a magnetic card, it is easy to alter or modify data having been recorded once. In contrast, because data is recorded by formation of pits in an optical card of the DRAW type (Direct Read After Write type), it is impossible to eliminate or erase pits having been formed once at the present stage. For this reason, a file management system having a good efficiency suitable for an optical card is required.

DISCLOSURE OF THE INVENTION

Objects of this invention are as follows.

(1) To provide a data recording format capable of making a track access having good efficiency in a reading system peculiar to an optical card, which is adapted to scan the card lengthwise and breadthwise with a beam.

(2) To provide a data recording format for an optical card, which is capable of conducting a reproduction or playback free from error, even if the surface of an optical card is scratched or has dust adhered thereto.

(3) To provide a method of exercising file management having good efficiency suitable for an optical card.

The first feature of this invention resides in a data recording method for an optical card to form a large number of tracks on the optical card to drive the optical card in a reciprocating manner in a direction parallel to the tracks, thereby recording data as pits on the tracks so as to permit reproduction or playback of user data. The guide sections in which no pit indicative of information is formed are provided on both ends of the tracks, respectively, and identification information for identifying respective tracks and termination information indicative of terminating portions of respective tracks are recorded at an inside portion adjacent to one guide section and an inside sections adjacent to the other guide portion, respectively, thus to record user data between the identification information and the termination information.

The second feature of this invention resides in a data recording method for an optical card to form a large number of tracks on the optical card to record data as pits on the tracks, wherein a series of bit train data to be recorded are divided into groups comprised of a predetermined number of bits, and error correcting codes are added to every respective group to constitute unit data blocks, thus to conduct recording by distributing data bits, which are extracted from the respective unit data blocks, on the optical card.

The third feature of this invention resides in a data recording method for an optical card to form a large number of tracks on the optical card and to form pits on the tracks to thereby record data.

The method comprises:

a definition stage for defining, on the optical card, at least three areas of a directory pointer area, a directory area, and a data area, a data write stage for writing data labelled a predetermined file name onto an unrecorded track of the data area;

a directory write stage for writing a number of a track onto which writing has been conducted at the data write stage onto an unrecorded track of the directory area together with the file name thereof; and a directory pointer write stage for writing, as a directory pointer, a number of a track onto which writing has been conducted at the directory write stage onto an unrecorded portion on the tracks of the directory pointer area.

The fourth feature of this invention resides in a data reproducing method for an optical card by reading pits formed in tracks on the optical card.

The method comprises:

a recognition stage for recognizing three areas of a directory pointer area, a directory area, and a data area which are defined on the optical card;

a directory pointer read stage for reading a track number recorded as a directory pointer in the directory pointer area;

a directory read stage for reading a track in the directory area corresponding to the track number having been read at the directory pointer read stage, thus allowing the information having been read to serve as directory information; and a data read stage for reading information in the data area on the basis of the directory information.

BRIEF DESCRIPTION OF THE DRAWINGS

FIG. 7 is a view showing the schematic configuration of an optical card format for exercising file management in accordance with this invention.

FIG. 8 is a view showing a track configuration of the optical card shown in FIG. 7.

FIG. 9, consisting of (a)-(d), is a view showing a further detailed configuration of respective track sections shown in FIG. 8.

FIG. 11 consisting of (a), (b), (c1), (c2) and (d) are views showing a data format of the optical card shown in FIG. 7.

BEST MODE FOR CARRYING OUT THE INVENTION

§1 Basic configuration of a reading and reproducing apparatus

Prior to the explanation of a data recording format of this invention, the basic configuration of a typical data recording and reproducing apparatus for an optical card will be described.

Figure 1:
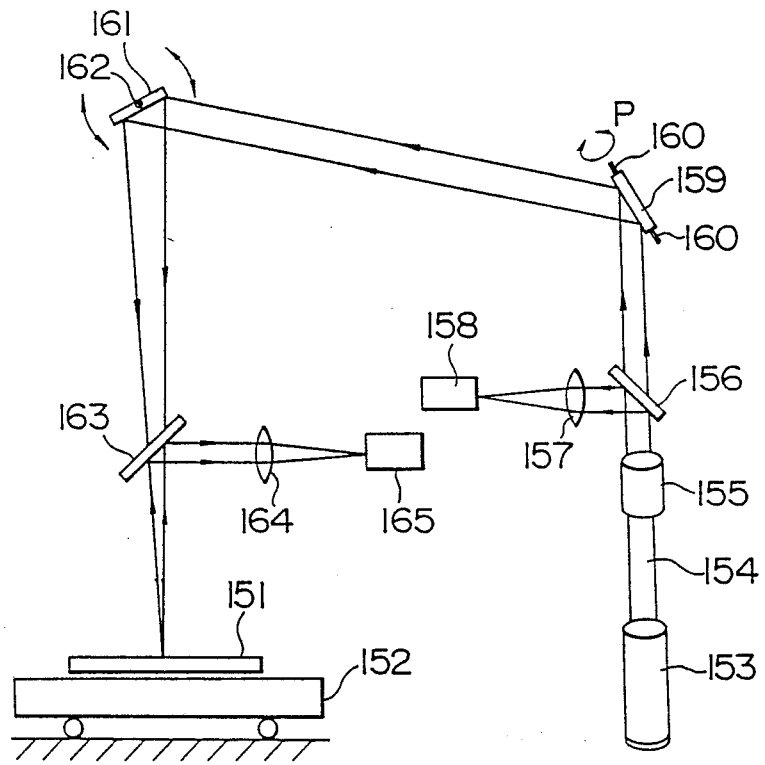
FIG. 1 is a view showing the basic configuration of a conventional typical data recording and reproducing apparatus for an optical card.

A data recording and reproducing apparatus shown in FIG. 1 is of the type which allows a card 151 to record data thereon, i.e., which scans the recording area surface of the card 151 by using a laser beam 154 generated from a light source 153 to thereby record or read desired data. In this example, means for carrying the card 151 onto the beam track is a holder 152. Means for scanning a beam on the card 151 which has been carried onto the beam track is servo control mirrors 159 and 161. The servo control mirror 159 is affixed so that it is rotated with a rotation shaft 160 being as an axis in a direction indicated by an arrow P, and serves to find out the edge in a lateral direction of a laser recording material in the rough mode of operation, and thereafter to identify a data track existing with it being spaced from the edge by a predetermined distance in the fine mode of operation. On the other hand, the servo control mirror 161 is affixed so that it is rotated about a rotation shaft 162, and serves to effect fine control of a movement of beam along the length of the card 151. Accordingly, by movement of holder 152 and scanning by servo control mirrors 159 and 161, recording/reproducing of data are conducted at a desired address.

For light source 153, a semiconductor laser is used in this example. In addition, a light emitting diode or a lamp, etc. may be used. In the case of recording, the recording surface is fused or melted by irradiating a high intensity light beam thereto.

Laser beams divided by the half mirror 156 are monitored by an optical detector 158 through a lens 157. Thus, confirmation of the beam intensity is made. At the time of reproduction or playback, a reflected light from the optical card 151 is detected by a light detector 165 through a half mirror 163 and a lens 164. Thus, presence and absence of pits are converted to an electric signal.

§2 Format of optical card

2.1 Information of prerecord

Figure 2:
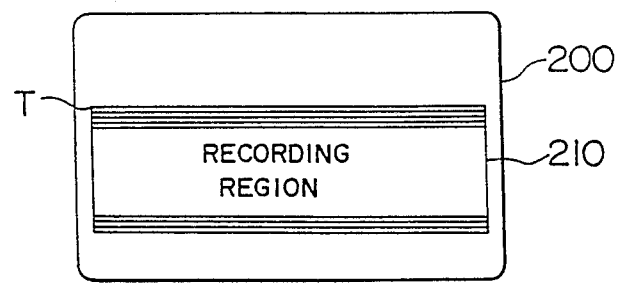
FIG. 2 is a top view of an optical card recorded by a format in accordance with this invention.

An example of a format of an optical card according to this invention will be described. FIG. 2 is a top view of an optical card 200. Data are recorded on a recording region 210 in the optical card 200. Within the recording section 210, a large number of elongated or narrow tracks T are formed in a lateral direction of the figure. Recording and reproducing of data are conducted by reciprocating this optical card 200 in a lateral direction of the figure to scan a laser beam along the tracks.

Figure 3:
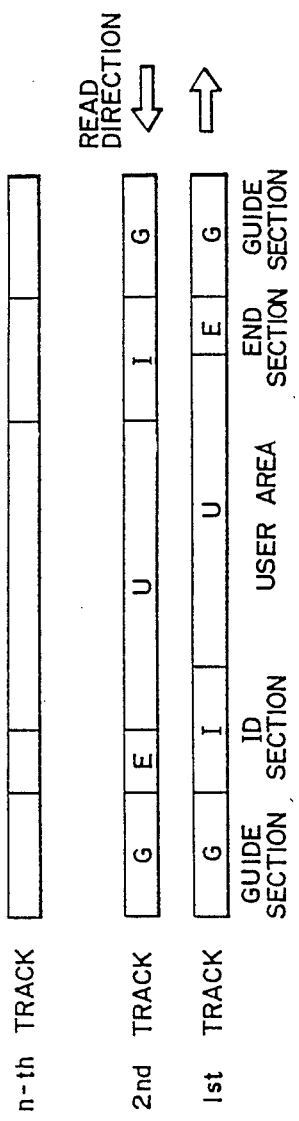
FIG. 3 is an enlarged view of a recording region of the optical card shown in FIG. 2.

For this purpose, the recording region 210 is composed of an n number of tracks as shown in FIG. 3, wherein each track is composed of a guide section G, an ID section I, a user area U, an end section E, and a guide section G in order recited in a read direction, and a group of tracks to be read in a right direction and a group of tracks to be read in a left direction are mixed with each other. In this example, odd tracks are read from the left to the right and even tracks are read from the right to the left. Since read directions are different interchangeably as stated above, it is possible to read the first track up to the n-th track in sequence with good efficiency by the reciprocating movement of the optical card. In this example, guide sections G are formed as continuous grooves, e.g., having a length of 5 mm, and are used for securing focusing or tracking when the optical card is accelerated or decelerated. Block addresses having a plurality of tracks as a group and track addresses within blocks are prerecorded in ID section I as information of tracks with they overlapping with each other. Information which is significant only when reading a track in an opposite direction is prerecorded on the end section E as termination information of tracks. Namely, in the case of reading a track in an opposite direction, the end section E comes immediately next to the guide section G. Thus, the system is informed at an early stage that the track is being read in an opposite direction. As described above, in this optical card, the direction from guide section G to ID section I is taken as a reading direction. Scanning of a laser beam is accelerated or decelerated at the guide section G, and is maintained at a predetermined speed at ID section I, user area U, and end section E. It is to be noted that while reading directions are interchangeably set every tracks in order from the first track in the example shown in FIG. 3, such directions are not necessarily set interchangeably. For example, in the case of an arrangement such that a plurality of heads are arranged to read a plurality of tracks at the same time or in the case of an arrangement such that reading heads in a right direction and those in a left direction are arranged spaced by a plurality of tracks, reading directions of a plurality of adjacent tracks may be the same, or reading directions may be the same in every block.

Figure 4A:
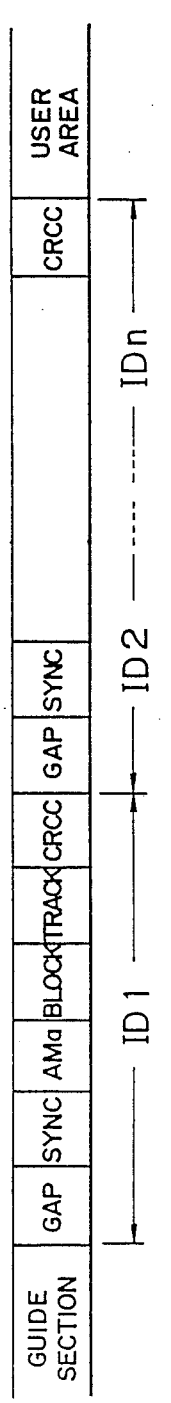
FIG. 4, consisting of (a)-(c), is a partially enlarged view of the tracks shown in FIG. 3.
Figure 4B:
Figure 4C:
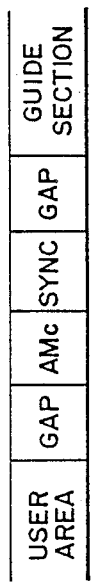

Further, in order to conduct tracking to effect recording and reproducing of a desired data while reciprocating the optical card, various information as described below are prerecorded into areas of the respective sections mentioned above. Namely, as shown in FIG. 4(a), ID section I is composed of Gap($FF_H$) for compensating operating time of hardware, a Sync-($OO_H$) successive thereto, an AMa($FE_H$) including a missing clock and indicating that next data is address, Block and Track of 2 byte data indicating address, and a CRCC for checking whether or not Block and Track are correctly read in. In addition, by prerecording a plurality of the same information overlapping with each other, a plurality of track retrievals are enabled during one reading operation. Moreover, as shown in FIG. 4(b), the user area is composed of a Gap($FF_H$), Sync-($OO_H$), an AMb($FB_H$) including a missing clock and indicating that data recording section begins from the next, a data recording section successive to Sync($OO_H$), and an MG for absorbing recording error. This data recording section is a continuous area corresponding to 1,024 bytes to form bits corresponding to the bit train using laser beam to record user data. As previously described, for allowing the end section E to have a meaning when reading in an opposite direction, this end section E is composed of, from the side of the backward guide section, a Gap, a Sync, an AMc($FD_H$) including a missing clock and indicating that the section concerned is an end section, and a Gap.

2.2 Recording of user data

Figure 5:
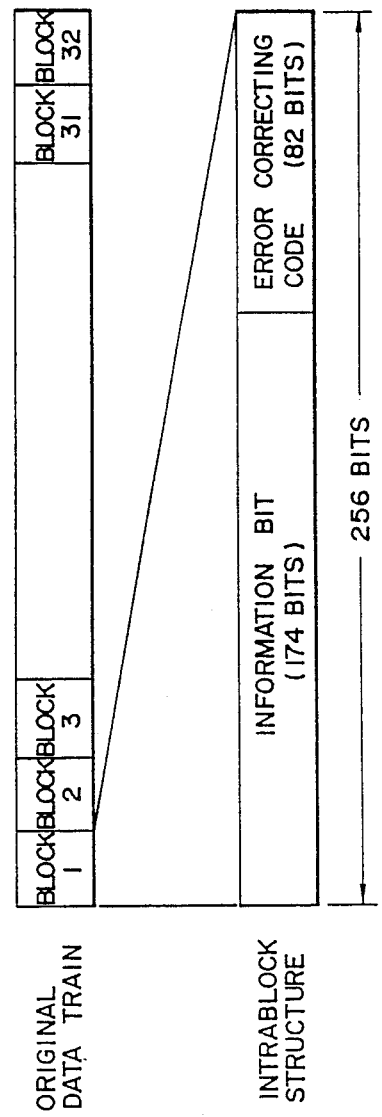
FIG. 5 is a view showing addition of an error correcting code in the format in accordance with this invention.

As described above, user data are recorded into user area U of respective tracks. Since an error is likely to occur in the optical card, it is also required for improving reliability of the system to adopt a data recording method resistant to error. To realize this, as shown in FIG. 5, original data to be recorded is constituted with, e.g., 32 blocks and each block is composed of information bits of 174 bits and error correcting code of 82 bits corresponding to the information bits. The first to the 32-th blocks are arranged as shown in FIG. 6(a), and bits of the first block are assumed as "1-1", "1-2", . . . , "1-256", bits of the second block as "2-1", "2-2", . . . , "2-256", bits of the i-th block as "i-1", "i-2", . . . , , "i-256", respectively.

Figures 6A, 6B, 6C:
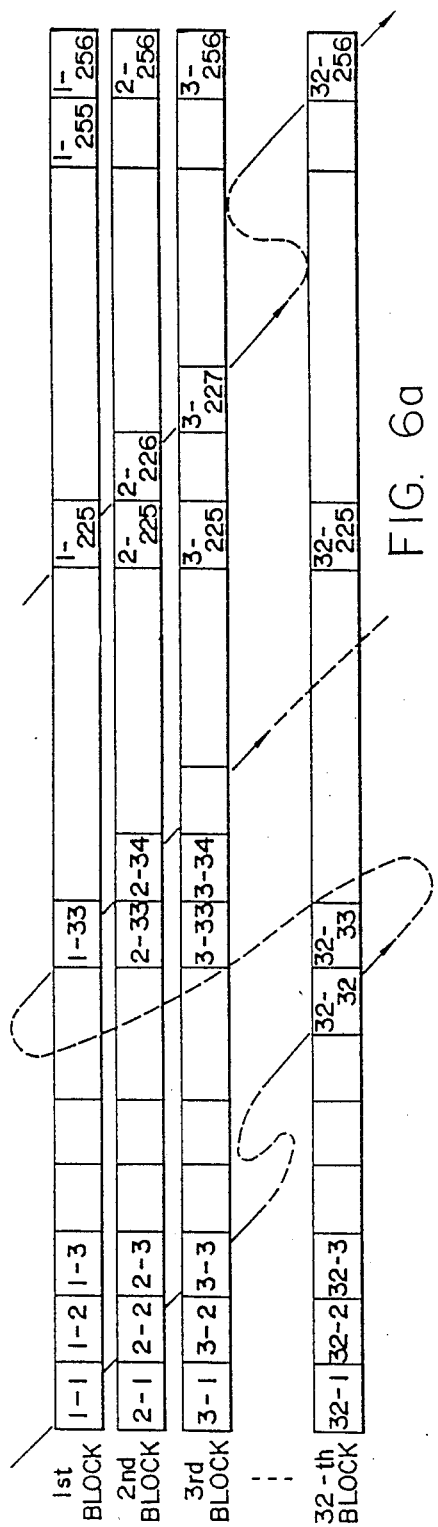
FIG. 6, consisting of (a)-(c), is a view for explaining the principle of an interleaving processing in the format in accordance with this invention.

As shown in FIG. 6(b),

① Bit train starting from the 1st bit "1-1" of the 1st block and including the 2nd bit "2-2" of the 2nd block, . . . the i-th bit "i-i" of the i-th block, . . . the 32-th bit "32-32" of the 32-th block, the 33-th bit "1-33" of the 1st block, . . . the 256-th bit "32-256" of the 32-th block is assumed as the 1'st block.

② Similarly, bit train starting from the 1st bit "2-1" of the 2nd block, bit train starting from the 1st bit "i-1" of the i-th block, and bit train starting from the 1st bit "32-1" of the 32-th block are assumed as the 2'nd block, the i-th block, and the 32'-th block, respectively. As shown in FIG. 6(c), data train comprising the 1'st block, the 2'nd block, . . . the i'-th block, . . . the 32'-th block arranged in order recited is assumed as a unit data train recorded on an actual card.

By executing such an interleaving processing, where data is broken over several ten bits in the recording data train of FIG. 6(c), so that burst error occurs, since those errors are considered as only an error of several bits in respective blocks when viewed in terms of the original data trains of FIG. 5, it is possible to carry out correction processing of such error by an error correcting code. Thus, information can be reproduced and used without hindrance.

It is to be noted that the format of this optical card is not limited to the above-described embodiment, but may be changed or modified in various manners While such an interleaving processing to distribute bits to be recorded at intervals of the number of blocks plus 1 bit is carried out in the above-described embodiment, positions of respective bits may be allocated to specific bit positions of respective blocks which actually effects recording. Namely, when bits originally belonging to the 1st block are assumed as bit 1, bit 33, bit 65, . . . of respective blocks used for actual recording, it is sufficient to select bit 1, bit 33, bit 65, . . . of recording blocks by using hardware such as a multiplexer, thus permitting deinterleaving processing to be faster. In a manner as described above, a scheme may be used to execute interleaving processing at intervals of the number of blocks or other intervals to distribute bits to be recorded. In addition, it is of course that the number of bits constituting one block may be changed according to the system scale or size.

As just described above, the data format according to this invention has interleaving and deinterleaving functions to divide bit train data to be recorded into a predetermined number of bit units to add error correcting codes every bit units to constitute a plurality of data blocks, thus making it possible to reconstruct information of a block unit with a high precision, resulting in an improved reliability of the system.

§3 File management of optical card

3.1 Difficulty in file management

As described above, the problem with an optical card is that file management is difficult. Generally, in magnetic recording media including a floppy disc, recording and reproducing of data with file being as a unit can be carried out. Namely, a directory area for conducting file management is provided separately from the data area for recording data to record file names or track numbers at which data is recorded, etc. into the directory area, thus to conduct file arrangement.

However, such a file management method exercised in magnetic recording media cannot be adopted in an optical card. This is because there is a fundamental difference between the magnetic recording medium and the optical card in that rewriting of data is possible in the magnetic recording medium, whereas rewriting of data is impossible in the most typical optical card called DRAW type optical card because data are written in the form of pits. Namely, since the directory area for conducting file management cannot be rewritten in the DRAW type optical card, it is difficult to cope with alteration or modification of the file information. For this reason, it is the present state that, in the case of recording data onto an optical card or reproducing them therefrom, users make a search for unused tracks, without conducting file management, to carry out recording and reproducing of information with the track being as a unit. Dealing with data with the track being as a unit as described above is extremely inconvenient, resulting in a great obstacle to popularization of optical cards.

3.2 Principle of file management according to this invention

In accordance with a data recording method for an optical card according to this invention, where alteration or modification occurs in the directory which conducts file management, a new directory is prepared on an unused track within the directory area. The track number at which this newest directory is recorded is recorded into the directory pointer area as a directory pointer. Every time directory is updated, the directory pointer is also updated. Every time each directory pointer is updated, respective directory pointers are recorded in succession into the directory pointer area.

On the other hand, in accordance with a data reproducing method for an optical card according to this invention, the newest directory pointer within the directory pointer area is first read out, and reference to the newest directory is made by this directory pointer.

Rewriting of data is impossible in the DRAW type optical card, but since a new directory is written every time directory is updated to specify the newest directory by the directory pointer in accordance with a method according to this invention, the same effect as rewriting of the directory will be produced.

3.3 Basic configuration of optical card

The configuration of an optical card itself used in a method according to this invention will be first described. It is to be noted that optical cards which will be described in the following embodiments are all a non-rewritable DRAW type optical card. FIG. 2 is a top view of this optical card. Recording region 210 is provided at the central portion of optical card 200. Within the recording region 210, a large number of tracks T are provided in a lateral direction as a portion thereof is shown in the figure. In this embodiment, 10,000 tracks T having a width of 1 μm are parallelly provided in upper and lower directions and are spaced by 1 μm from each other. The recording region 210 is divided into four areas as shown in FIG. 7. Each area consists of a set of a plurality of tracks and the track numbers are shown on the left side of the figure. Card ID area 211 is an area for recording data peculiar to the card and 10 tracks of the first up to the tenth tracks are formed in this embodiment. Directory pointer area 212 is an area for recording directory pointers which will be described later in detail and has tracks of the 11th up to the (Tdir-1)-th tracks. Directory area 213 is an area for recording directory for conducting file management and has tracks of the Tdir-th up to the (Tdata-1)-th tracks. In addition, data area 214 is an area for actually recording data of user and has tracks of the Tdata-th up to the Ttotal-th tracks. It is to be noted that Ttotal is equal to 10,000, and Tdir and Tdata are determined to be optimum values according to initialization by the user, respectively.

3.4 Basic configuration of track

The basic configuration of each track will be now described. An example of the configuration of one track in conformity with the format of this invention has been already described in §2. The basic configuration of track described here is a modification in which some alterations or modifications are added to the configuration having been described in §2. Two adjacent tracks T1 and T2 are shown in FIG. 8. In the embodiment shown here, track T1 is scanned from the left to the right in the figure and track T2 is scanned in an opposite direction, i.e., from the right to the left in the figure. Either track is composed of a guide section, flag section, ID section, 1st sector, 2nd sector, ..., n-th sector, end section, and another guide section in the order recited along the scanning direction. In this embodiment, there is employed a track configuration such that the scanning direction is interchangeably reversed, i.e., odd tracks are scanned from the left to the right and even tracks are scanned from the right to the left, but a configuration such that all tracks are scanned in the same direction may be adopted.

FIGS. 9(a) to (g) show the details of respective sections constituting the above-mentioned track. As shown in FIG. 9(a), the guide sections are each comprised of pitless grooves and are provided on both the ends of the track, respectively. In the case of an optical disk, tracking of track is conducted by rotation of the disk. In contrast, because such a tracking is conducted by reciprocating movement in an optical card, it is required to provide sections for effecting acceleration at the initial end of the track and deceleration at the terminating end thereof, thus allowing focusing or tracking to be suitably carried out. Respective guide sections are sections for acceleration and deceleration and each has a length of 8 mm in a length direction thereof in this embodiment.

The flag section successive to the guide section is a section indicating whether or not this track is in an unrecorded state, and is constituted as shown in FIG. 9(b). The gap positioned first is data of 4 bytes for compensating the operating time of hardware, Sync successive thereto is data of 8 bytes for ensuring synchronization of read timing, AM1 next thereto is data of 4 bytes by which a first address mark indicating that this section is a flag section is recorded, and Sync next thereto is data of one byte for ensuring synchronization for a second time. Predetermined data are written in advance in the above-mentioned respective sections and only Idle and Flag sections next thereto are in an unrecorded state. Idle is data of one byte provided for preparation of reading of Flag positioned next and data of one byte indicating that this track is in a recorded state is written into Flag. Accordingly, when no data is written in Idle and Flag, it is indicated that this track is in an unrecorded state, while when any data is written therein, it is indicated that this track is in a recorded state. The reading system of the optical card reads this flag section, thereby making it possible to detect that track state with hardware.

It is to be noted that because file is supervised by file directory, this flag section is not necessarily required. If there is no need to record information indicating whether or not tracks have been recorded, respectively, such a flag section may be omitted.

ID section next to the flag section is a section for recording the track No. of the track and is constituted as shown in FIG. 9(c). In this example, Gap and Sync are the same data as those described above. AM2 is data of 4 bytes by which a second address mark indicating that this section is an ID section is recorded. Track No. next thereto is data of 2 bytes indicating the track No. of this track. Further, CRCC is an error check code of 2 bytes for checking the occurrence of an error at the time of reading the track No. The arrangement thus constituted is repeated five times in the ID section to give redundancy thereto.

Another example of the configuration of ID section is shown in FIG. 9(d). In this example, Sync of 7 bytes is provided next to CRCC and JA of 20 bytes is provided next thereto. Sync is bits for synchronization as described above. JA is a track only comprised of solely grooves similarly to the above-described guide section. This JA serves to stabilize tracking when scanning beam jumps from one track to another track. Namely, the same content is repeatedly recorded five times in ID section, and it is assumed that recording to the first time is read to identify a track No. being scanned at present, thereafter allowing the scanning beam to jump to another track. In this case, the scanning beam will initiate reading just from the recording of the second time of the ID section of the track to which scanning beam has jumped. However, until vibration of the scanning beam is stabilized after jump, so that a stable tracking is conducted, it takes a certain time. JA serves as an area subjected to scanning of scanning beam for an unstable time period after jump. Since no necessary information is recorded in JA's, there occurs no problem even if the scanning is unstable.

Next to ID section, a plurality of sector sections are provided. In these sector sections, data to be essentially recorded themselves are recorded. As described later, the number of sectors per each track is 32 for tracks within the directory pointer area 212 and is 3 for tracks within the areas 211, 213 and 214 except for the above. The configuration of each sector is shown in FIG. 9(e). In this configuration, Gap and Sync are as previously described. AM3 is data of 4 bytes which has recorded a third address mark indicating that this section is a sector section. Sector No. next thereto is data of 2 bytes indicating where this sector is among sectors in the track, and is accompanied backward by CRCC which is an error check code of 2 bytes. At the back of this, Sync of one byte for synchronization is provided Idle is data of one byte for preparation of reading of Data next thereto and data itself that user intends to actually record is recorded in DATA. In the area DATA, data of 512 bits (4 bits only for the track within the directory pointer 212 as described later) is recorded.

FIG. 9(f) is another example of the configuration of one sector. In this example, both track number (TRACK No) and sector number (SECTOR No) are recorded in respective sectors. Even in the case of initiating to read from an arbitrary sector, this is convenient in that it is possible to recognize which sector of any track is being read. Moreover, MG of one byte is provided next to Data, which is an interference area in the case where scanning of a laser beam used for writing is prolonged. Even where laser beam overruns the area of DATA at the time of writing, provision of MG makes it possible to prevent the head portion of the next sector from being broken. It is to be noted that it is useful to provide a non-sense area having no meaning as data between the final sector and end section successive thereto to allocate a fraction byte less than one sector thereto.

End section is a section indicating the termination of the track and serves to inform the reading system that track is scanned erroneously in an opposite direction. This end section has a configuration as shown in FIG. 9(g). For example, in the case of scanning track T1 shown in FIG. 8 in an opposite direction erroneously from the right to the left, end section is scanned in the opposite direction subsequently to the guide section. However, following Gap and Sync, AM4, i.e., a fourth address mark indicating the end section is read prior to first and second address marks AM1 and AM2. Thus, hardware can judge such an abnormal state. It is to be noted that while tracks are scanned by turns, i.e., from the left to the right and from the right to the left in the above-mentioned embodiment, such an end section is unnecessary in the case of carrying out scanning only in one direction at all times.

Further, as a different embodiment, such data to have the relationship of reflected image with respect to data of the ID section may be recorded in the end section. Namely as shown in FIG. 9(c) ID section is such that Gap, Sync, AM2, Track No, and CRCC are arranged from the left to the right in order recited, whereas end section is such that they are arranged from the right to the left wherein AM4 is recorded in place of AM2. Thus, when track is erroneously scanned in an opposite direction, it is possible to identify which track is being scanned from the information recorded in the end section, and since AM4 is read in place of AM2, it is possible that scanning is reversely conducted.

Figure 10A:
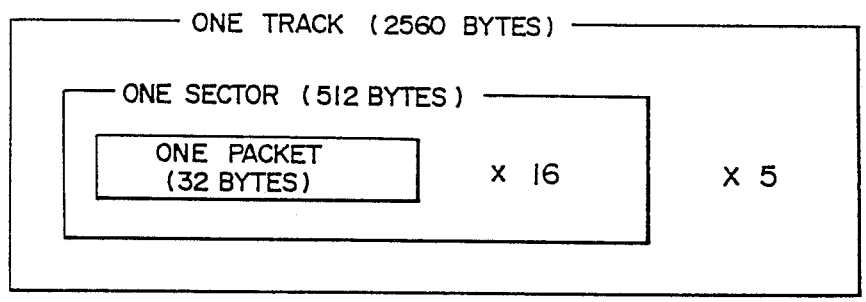
FIG. 10(a) and (b) are views showing a data configuration of a single track of the optical card shown in FIG. 7.
Figure 10B:
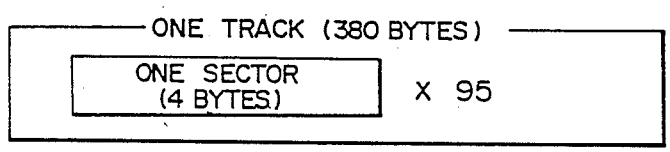

FIG. 10 is a view showing the data configuration in each track. As described above, actual data is recorded only in the section of DATA of each sector section. The data configuration in each track within card ID area 211, However, such a file management method exercised in directory area 213, and data area 214 is shown in FIG. 10(a). Within these areas, one track is comprised of five sectors wherein data of 512 bytes is recorded in one sector (in DATA of FIG. 9(e)). This data of 512 bytes is composed of 16 sets of packets of 32 bytes. Accordingly, the minimum unit of data is a packet of 32 bytes. On the other hand, the data configuration in each track within the directory pointer area is as shown in FIG. 10(b). Namely, data of 4 bytes is recorded in one sector (in DATA of FIG. 9(e)) and one track is comprised of 95 sectors. It is assumed that respective data of track described below all mean data recorded in DATA constituted above.

3.5 Basic structure of data for conducting file management

The configuration of optical card has been described in detail. Now, the basic structure of data for conducting file management using such an optical card will be explained.

① Card ID area 211

Card ID area 211 is an area which is first read when an optical card is inserted into a recording and reproducing apparatus. In this embodiment, the first track is initially read. In the first packet of the first sector of the first track, data is recorded in accordance with a format as shown in FIG. 11(a). Namely, No. Ttotal of the final track of this optical card is recorded in the first section of 2 bytes, start track No. Tdir of the directory area is recorded in the next section of 2 bytes, and start track No. Tdata of the data area is recorded in the further next section of 2 bytes (see FIG. 7). Moreover, an error correcting code ECC is recorded next "0" trains of 15 bytes. These data are recorded when the user has initialized the optical card. As described above, 10,000 tracks are formed in the recording region 210 of optical cards according to this embodiment wherein 10 tracks are used for card ID area 211 and the remaining tracks are allocated to directory pointer area 212, directory area 213 and data area 214. However, such an allocation cannot be determined on a simple basis. In the case of using this optical card in order that user records an extremely large capacity of data, it would be necessary to allow the data area 214 to be broad. Further, in the case of such a use to deal with an extremely large number of files, it would be necessary to allow the directory area 213 to be broad. Accordingly, allocation most efficient for the utilization manner of the user is made at the time of initializing this optical card and the result thereof will be recorded as shown in FIG. 11(a). It is to be noted that while only the content of the first packet of the first sector of the first track in the card ID area 211 is indicated here, other information peculiar to the card for specifying the card are recorded in packets successive thereto. The recording and reproducing apparatus reads thereinto data within ID area, thereby making it possible to recognize an area configuration as shown in FIG. 7.

Figure 12:
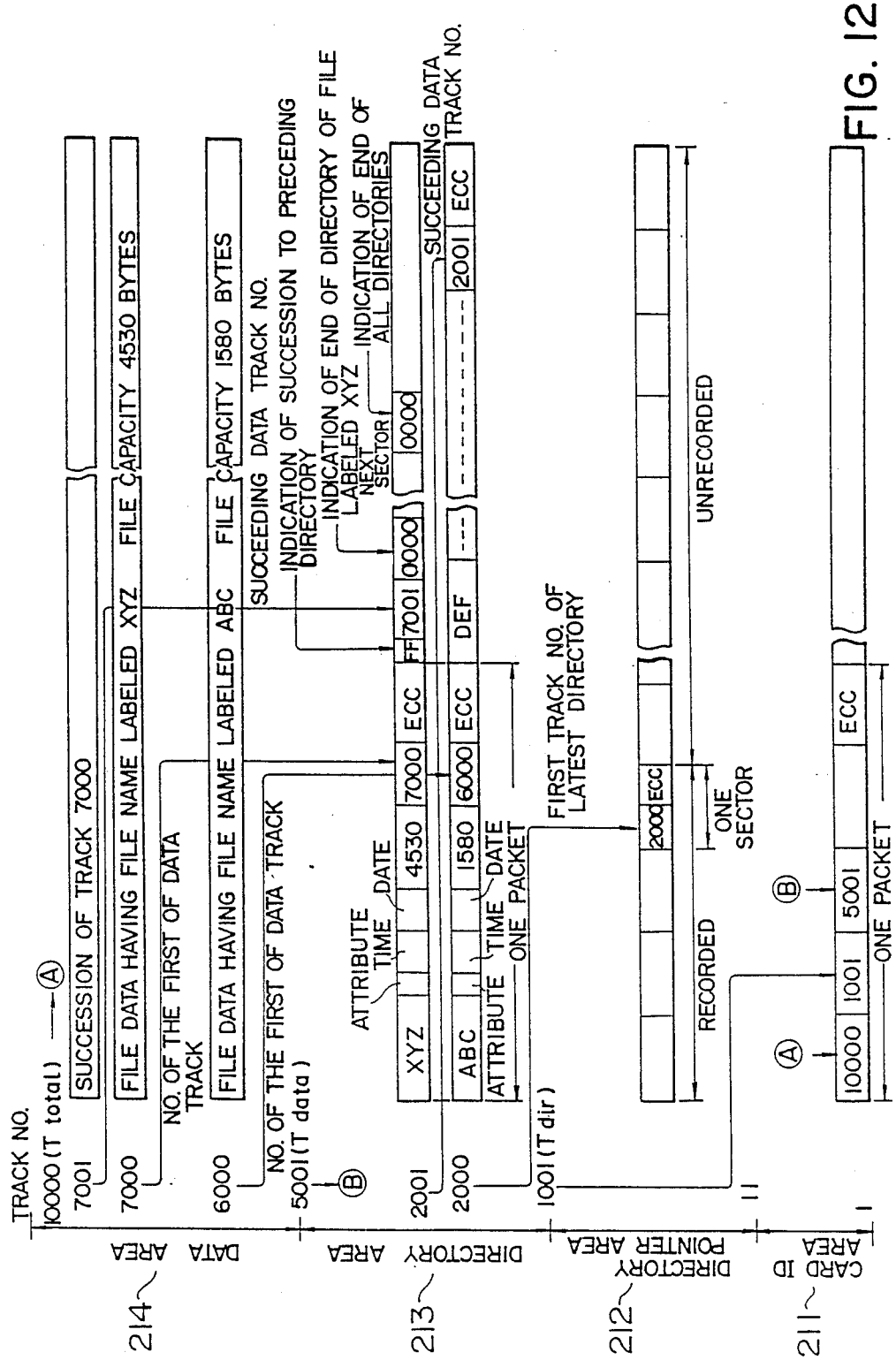
FIG. 12 is a view showing an actual data arrangement of an optical card recorded by a method according to this invention.

FIG. 12 is a view showing an actual data basic structure of recording region 210 of the optical card having been recorded by the method according to this invention. It is to be noted that only the original data recorded in the section of Data of FIG. 9(e) is shown in this figure. In the first packet of the first sector of the first track of the card ID area, data is recorded in accordance with a format shown in FIG. 11(a), wherein 10,000, 1,001 and 5001 represent Ttotal, Tdir and Tdata, respectively.

② Directory pointer area 212

In the case of this embodiment, directory pointer area 212 includes the eleventh track up to the 1,000-th track, and this directory pointer area is such that one sector is composed of only 4 bytes differently from other areas as described above. As seen from the format shown in FIG. 11(b), this sector of 4 bytes is composed of data of 2 bytes of POINTER and data of 2 bytes of ECC which is an error correcting code thereof, wherein POINTER indicates a start track (track and sector, if necessary) of the directory in the directory area 213. Since a large number of sectors are provided in the directory pointer area 212, a large number of data as shown in FIG. 11(b) are repeatedly recorded. As described later, the value in the final sector thereof represents a start track No. of the newest directory.

In FIG. 12, a plurality of sectors are shown in the directory pointer area 212, and a track No. 2,000 as well as error correcting code ECC is recorded in the recorded final one sector. Sectors forward therefrom are in an unrecorded state. Accordingly, the start track of the newest directory is the 2,000-th track.

It is to be noted that when error correcting code ECC is constituted with data of 11 bytes, although this is redundant, such an error correcting code ECC has the same length as those of other ECC, resulting in the merit that a common error processing system can be used.

③ Directory area 213

In the case of this embodiment, directory area 213 includes the 1,001-th track up to the 5,000-th track. Data are recorded thereinto with a packet being as a unit. Data format in one packet is either (C1) or (C2) in FIG. 11. Ordinarily, file information related to one file, i.e., directory is recorded in accordance with the format of (C1), and when directory fails to be contained in one packet, a necessary number of formats of (C2) are added to the format of (C1).

In the format of (C1), file name (11 bytes) in the beginning, attribute of its file (1 byte) subsequent thereto, time (2 bytes) and date (2 bytes) at which file is recorded, capacity of file (3 bytes), No. of the first track (2 bytes) of tracks on which actual file data are recorded, and error correcting code ECC (11 bytes) of these data are recorded. Since only No. of the first track is recorded in the format of (C1), there is no problem in the case of a file such that actual file data is accommodated within one track, but solely the format of (C1) is insufficient in the case of a file such that recording is made over a plurality of tracks. To overcome this, the format of (C2) is added. In the format of (C2), data CON of one byte indicating that this packet has format of (C2) continuous to the preceding packet is recorded in the beginning. Subsequently, data of 20 bytes (corresponding to 10 tracks at the maximum) indicating No. of succeeding tracks following the first track having been recorded in the format of (C1) are recorded. Finally, error correcting code ECC of 11 bytes of these data is recorded.

In the case of this embodiment, data "FF" is recorded in CON. Accordingly, using "FF" as the first byte of the file name is inhibited. In accordance with this rule, if the first byte of the packet of the directory area is "FF", it is possible to recognize that the packet is a packet continuous to the preceding packet having been recorded in accordance with the format of (c2), and if the first byte is other than "FF", it is possible to recognize that the packet is a packet indicating the directory of a new file having been recorded in accordance with the format of (c1). Further, the following meaning is defined in track No. recorded at positions of succeeding tracks of the format of (c2).

(a) When Tdata≦T≦Ttotal

This is the most ordinary case and indicates track No. in the data area in which the file data concerned is recorded.

(b) When Tdir≦T<Tdata

This indicates a next track No. that directory is to be continued, recorded at the terminating portion of the track in the directory area.

(c) When T=0

This indicates that directory in regard to one file has been completed.

(d) When the first or beginning of the sector denotes T=0.

This indicates that all directories have been completed.

The meaning of the above-mentioned format will be readily understood by making reference to an actual example of FIG. 12. As previously described, by reading the final sector recorded in the directory pointer area 212, it is recognized that the newest directory first track No. is 2,000. Thus, when reading is conducted from the 2,000-th track in the directory area 213, directory will be obtained. In this example, directory of a file having a file name ABC is first recorded After attribute, time, and date are recorded, the fact that capacity is 1,580 bytes and the first track is the 6,000-th track (which corresponds to the above-mentioned item (a)) will be recorded. Similarly, directory of a file having a file name DEF is recorded in the next file. In this way, file directories are recorded in succession onto the 2,000-th track. In the final packet, 2,001 is recorded as a track No. This indicates that directories are continuously recorded on the 2,001-th track (which corresponds to the above-mentioned item (b)). In the beginning of the continuous 2,001-th track, a directory of a file having file name XYZ is recorded. This file has a capacity of 4,530 bytes and is recorded from the 7,000-th track. In addition, since the beginning of the next packet is "FF" (format (C2)), the directory in regard to file XYZ is continuous to the next packet. Namely, it is shown that file data is also recorded on the 7,001-th track. "0000" next thereto indicates that the directory of the file labeled XYZ is completed here (which corresponds to the above-mentioned item (c)). Thus, it is possible to confirm that the file data of file XYZ begins with the 7,000-th track and ends at the 7,001-th track. The final "0000" indicates that all directories have been completed (which corresponds to the above-mentioned item (d)). Eventually, file XYZ can be said to be the final file recorded in the card.

The processing with a track being as a unit has been shown. For executing a finer processing with a sector being as a unit, an area of 2 bytes (16 bits) for recording track information may be divided into two areas of 14 bits and 2 bits to record data indicative of a specific track and data indicative of a specific sector of that track in the areas of 14 bits and 2 bits, respectively.

④ Data area 214

In the case of this embodiment, data area 214 includes the 5,001-th track up to the 10,000-th track. On the track in this data area 214, data to be originally recorded itself is recorded in accordance with the format as shown in FIG. 11(d). Namely, user data to be originally recorded is recorded into one packet by 21 bytes and error correcting code ECC is added thereto by 11 bytes.

In the example shown in FIG. 12, file data of file ABC is recorded onto the 6,000-th track, and file data of file XYZ is recorded onto the 7,000-th and the 7,001-th tracks.

3.6 Procedure of recording and reproducing

Figure 13:
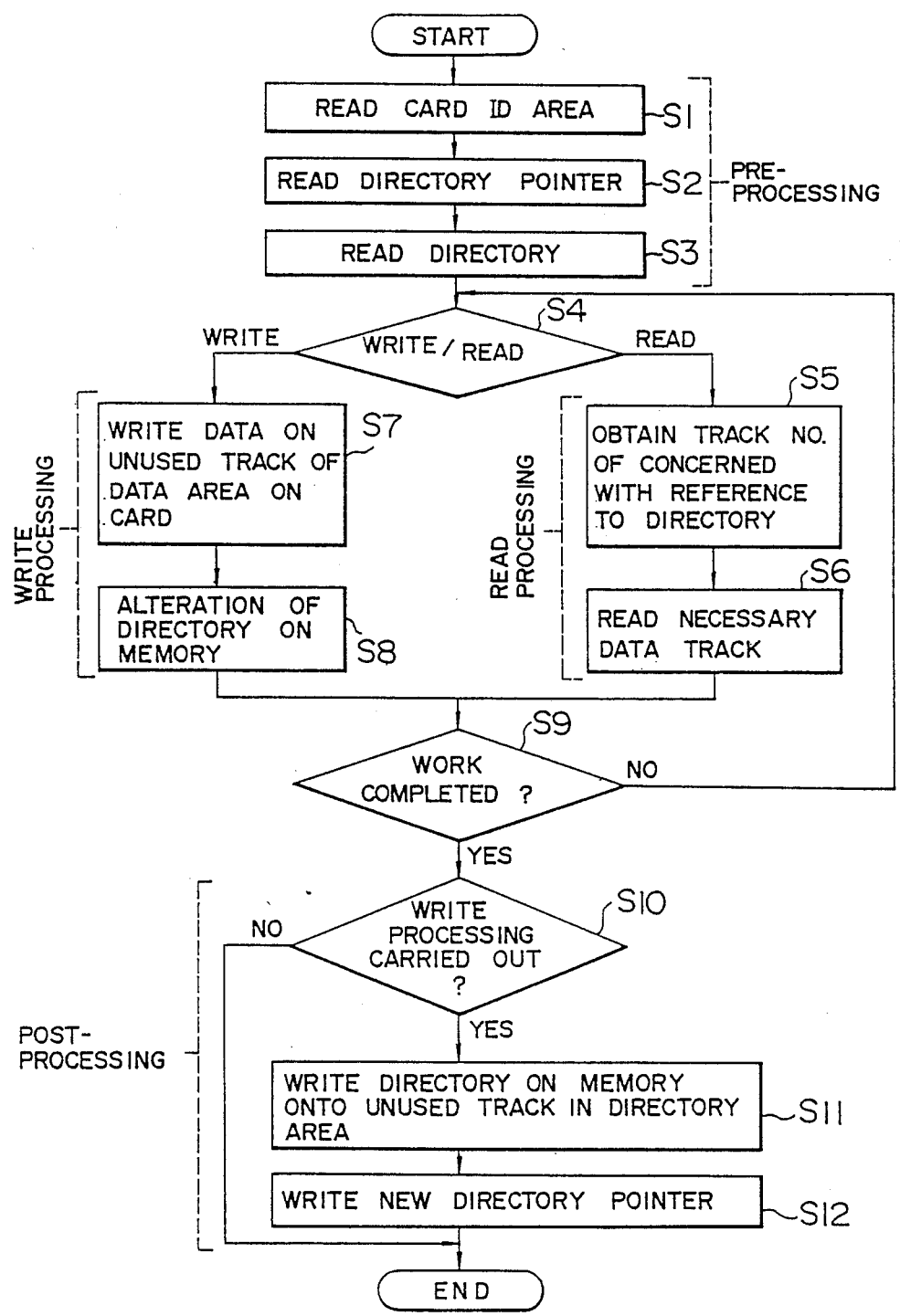
FIG. 13 is a flowchart showing the procedure of a data recording method for an optical card and a data reproducing method therefor when file management by this invention is exercised.

The data format of an optical card used in the method according to this invention has been described in detail. Now, the procedure for recording data onto the optical card and reproducing therefrom will be explained with reference to the flowchart of FIG. 13. When rough classification is made, the flowchart of FIG. 13 comprises four processings of preprocessing, read processing, write processing, and post-processing. The preprocessing is a processing corresponding to a preparatory stage when the recording and reproducing work is initiated, and aims to read the newest directory from the directory area 213 of the optical card into the memory in the recording and reproducing apparatus. The read and write processings are processings such that user reads data from the data area 214 of the optical card and/or writes them thereinto as defined by the title of the processings. When write processing is conducted, directory on the memory is altered. The post-processing aims to record, as the latest directory, an altered directory when there is an alteration in the directory on the memory into the directory area of the optical card.

At step S1, reading of card ID area 211 is initially carried out. The card ID area 211 is an area which is read for the first time when the optical card is inserted into the recording and reproducing apparatus as previously described. As shown in FIG. 12, maximum track No. Ttotal (10,000), directory area start track No. Tdir (1,001), and data area start track No. Tdata (5,001) area are read into this area. Moreover, as described above, other information peculiar to the card for specifying this card recorded in the card ID area are read in at the same time.

Subsequently, at step S2, reading of the directory pointer is carried out. In the case of this embodiment, the directory pointer area includes the eleventh track up to the 1,000-th track and all tracks having been read thereamong are read in. A track No. having been read last is recognized as a first track No. of the latest directory at all times. In the example of FIG. 12, only the track No. 2,000 is a significant data, but other all track No. data recorded in the directory pointer area have not any meaning.

At step S3, reading of directory is carried out and directory read in at this step is the newest directory. Namely, directory beginning with the track No. recognized at the step S2 is read in. In the example of FIG. 12, directory beginning with the 2,000-th track is read in. Since data indicating that the 2,000-th track is continuous to the 2,001-th track is present at the termination of the 2,000-th track, reading succeeds the 2,001-th track. When data of "0000" indicating completion of all directories has read in, reading of the directory is completed. Accordingly, in the example of FIG. 12, data on the 2,000-th and the 2,001-th tracks are read into the memory. Thus, the directory is developed on the memory.

By the above-described preprocessing stage, the directory is developed on the memory. Thus, read and write preparations are made. At step S4, a judgement is made as to whether the processing to be executed next is read or write.

The read processing is executed as follows. First, at step S5, an operation for obtaining a track No. of a file concerned is carried out with reference to the directory. For instance, in the case of reading file XYZ, file name XYZ is retrieved from the directory (equivalent to that shown in the directory area 213 of FIG. 12) developed on the memory, thus to recognize that this file is recorded on the 7,000-th and the 7,001-th tracks.

Subsequently, at step S6, information of the track concerned in turn reads in from the data area of the optical card, thus to read the file data of file XYZ onto the memory.

On the other hand, write processing is carried out as follows. Initially, at step S7, data is written onto unused tracks of the data area 214 on the optical card. Such a writing is the same either in the case of writing a new file or in the case of modifying the existing file to write it. Since data cannot be altered or changed in the optical card, even in the case where a portion of data within the existing file is changed, the file having been changed is to be written entirely It is to be noted that since information indicating whether or not track is in an unused state is recorded in the flag section of each track as described above, the recording and reproducing apparatus can easily find out unused tracks in the data area 214.

When writing of data onto the optical card has been completed, an alteration of the directory on the memory is carried out at step S8. Since rewriting of data is permitted on the memory, it is possible to easily change the existing directory. If a new file is added, an alteration for adding directory for the file will be made. Further, if an alteration of the existing file is carried out, since file data changed should have been newly written entirely at step S7, it is necessary to change the track No. of the directory to a new one. For example, where a portion of file XYZ is changed in the example of FIG. 12, file data of the file XYZ is newly written onto, e.g., the 7,002 th and the 7,003-th tracks, thus to rewrite data of "7,000" and "7,001" of the directory on the memory so that they are changed to data of "7,002" and "7,003".

Until such read and write works are all completed, similar operations will be repeated (step S9). It is to be noted that during read and write processings, the data area 214 of the optical card is accessed, but the directory area 213 is not accessed by any means. Since the directory is developed on the memory by the preprocessing, it is possible to obtain file directory by providing an access to the directory on the memory. In addition, an alteration of the directory is only conducted on the memory at this time. Thus, there is no change in the directory area and the directory pointer area on the optical card.

When an ordinary work is completed, post-processing will be conducted. Initially, at step S10, judgement as to whether or not write processing is carried out is made. Where any write processing is not carried out, it is possible to complete the processing as it is. On the contrary, where at least one write processing is conducted, an alteration of the directory on the optical card becomes necessary. For this purpose, at step S11, the directory on the memory is written onto unused tracks in the directory area on the card. In the example of FIG. 12, if there is any alteration even in a portion of the directory having been recorded on the 2,000-th and the 2,001-th tracks, the directory changed on the memory is to be written onto, e.g., the 2,002-th and the 2,003-th tracks.

Subsequently, at step S12, writing of a new directory pointer is carried out. In the above-described example, since the start track of the newest directory is the 2,002-th track, data of "2,002" will be written into the sector next to the final sector having been subjected to recording. Thus, the directory recorded from the 2,002-th track is to be dealt as the newest directory from the next time. Finally, the optical card is taken out from the recording and reproducing apparatus. Thus, all works are completed.

3.7 Different embodiment 1

Figure 14:
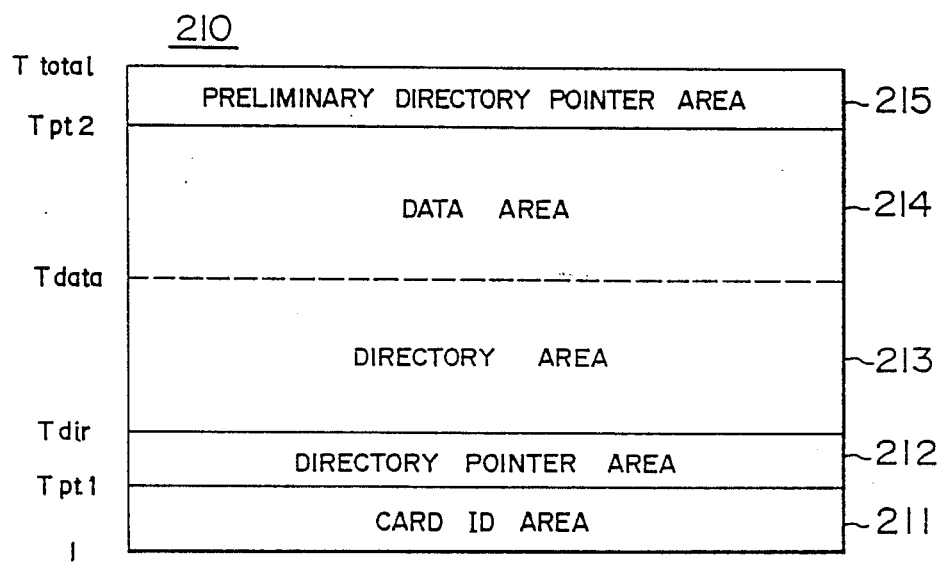
FIG. 14 is a view showing a schematic configuration of an optical card used in a method according to another embodiment of this invention.

A schematic configuration of a recording region 310 of an optical card used in a method according to a different embodiment of this invention is shown in FIG. 14. This embodiment differs from the above-described embodiment shown in FIG. 7 in that a preliminary directory pointer area 215 is provided. The format in the preliminary directory pointer area 215 is completely the same as that in the directory pointer area 212. Namely, at the time of the writing work of the directory pointer at step S12 of the flowchart of FIG. 13, data of which content is completely the same as that written into the directory pointer area 212 is written also into the preliminary directory pointer area 215. The directory pointer consists of relatively lesser data of only 4 bytes. However, where this directory pointer is not normally read, there occurs a fatal hindrance such that any file is not read from the optical card. By recording directory pointer into two areas, the possibility that such a serious hindrance would occur can be reduced to an extremely low degree. Namely, even in the case where there is a failure to read the directory pointer in the directory pointer area 212, it is possible to read instead the directory pointer in the preliminary directory pointer area 215.

Figure 15:
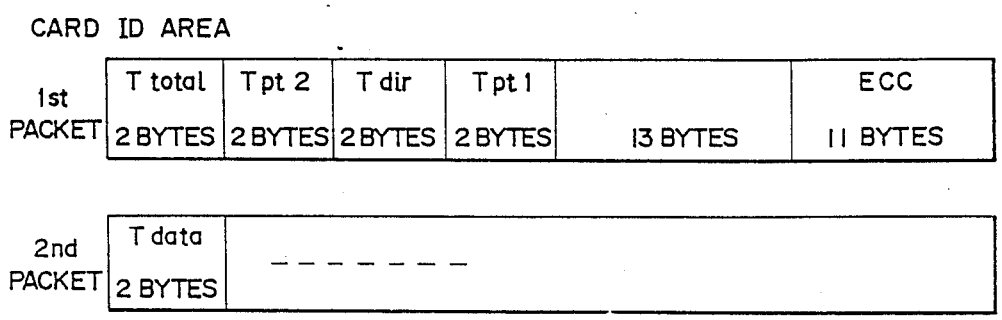
FIG. 15 is a view showing a data format of a card ID area in the optical card shown in FIG. 14.

FIG. 15 is a view showing an example of the format of card ID area 211 in the optical card shown in FIG. 14. In this example, respective track positions Ttotal, Tpt2, Tdir and Tptl shown in FIG. 14 are recorded into the first packet of the first sector of the first track, and Tdata is recorded into the second packet thereof. In this embodiment, only the position of Tdata (shown by broken lines in FIG. 14) can be selectively determined by user. Other respective track positions (respective positions shown by solid lines in FIG. 14) are already fixed when the optical card is handed over to user. Accordingly, when this optical card is in user's hand, data of the first sector of FIG. 15 has been already recorded. By initialization by user, only Tdata of the second packet will be written in. As shown in FIG. 10, since the data configuration of one track in the directory pointer area 212 is different from the data configuration in other areas, it is useful to determine in advance positions of the directory pointer area 212 and the preliminary directory pointer area 215 to provide in advance 32 sectors in tracks of these areas as shown in FIG. 10(b), and to provide in advance three sectors consisting of 16 packets in tracks of other areas as shown in FIG. 10(a). Accordingly, in this embodiment, free selection of user is permitted only at the position of Tdata, thereby to avoid an erroneous initialization. When positions of respective areas can be determined in this way, it is possible to deliver the optical card to user with respective sections (except for DATA section of sector) shown in FIG. 9 being formed on tracks. It is to be noted that when one original block on which respective sections are formed by laser is prepared, optical cards having the same format can be mass-produced by replicating such an original block.

3.8 Different embodiment 2

Figure 16:
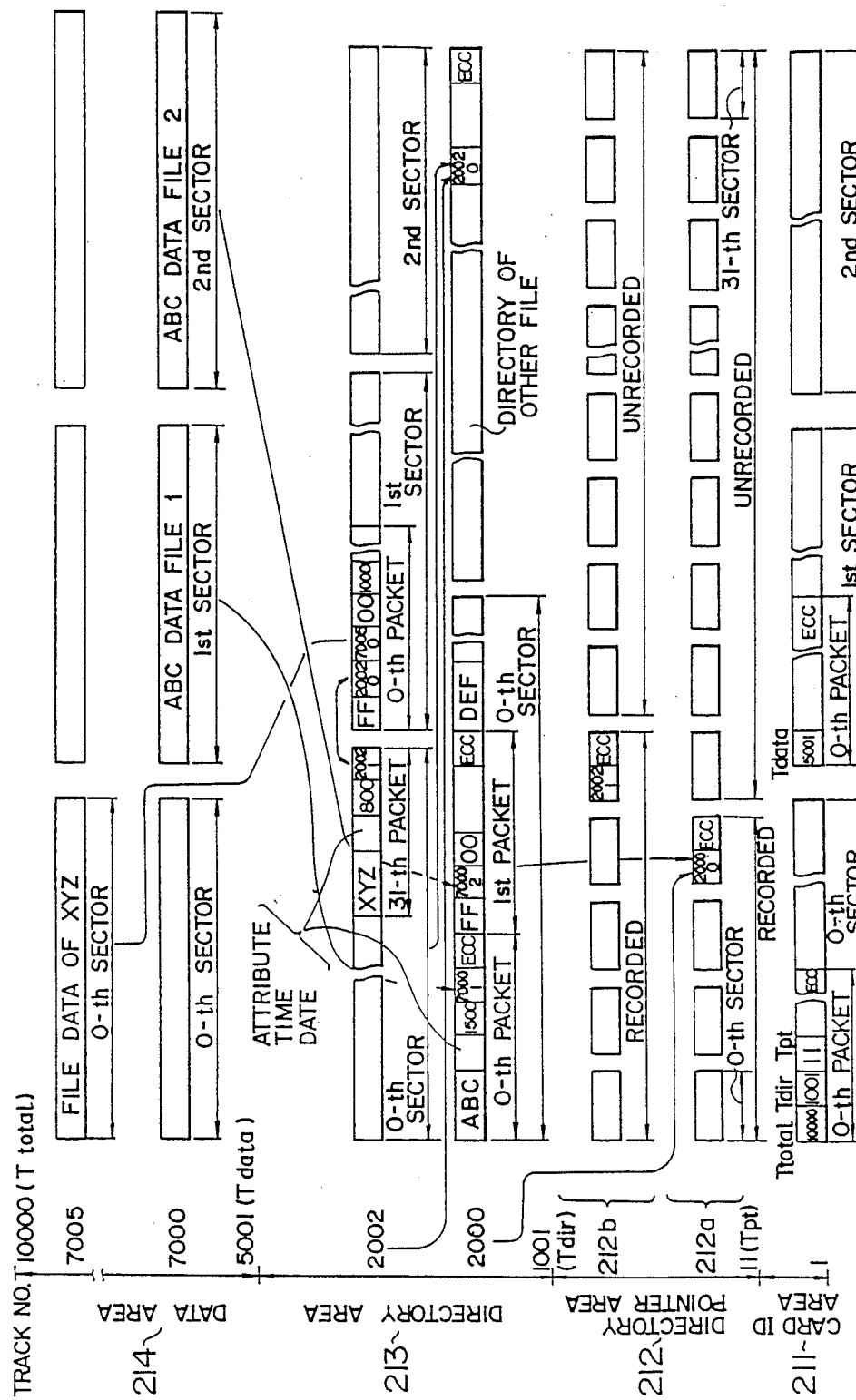
FIG. 16 is a view showing another example of an actual data arrangement of an optical card recorded by a method according to this invention.

FIG. 16 shows an actual data arrangement of an optical card recorded in accordance with a format according to a further different embodiment of this invention. In this example, a directory pointer area start track No. Tpt (11) is also recorded in the card ID area 211. This format is characterized in that the directory pointer area is divided into a start pointer area 212a and an end pointer area 212b. A start pointer (2,000/0) and an end pointer (2,002/1) are in the finally recorded sectors of respective areas. In this example, respective pointers make a designation with a sector being as a unit wherein the start pointer indicates that the directory begins with the 0-th sector of the 2,000-th track, and the end pointer indicates that the directory begins with the first sector of the 2,002-th track. As stated above, in this embodiment, start and end positions of the directory are designated.

This invention is further characterized in that when directory is continuous to another sector, data for indicating continuation of directory between sectors is recorded. Namely, data of (2,002/1) recorded at the termination of the 0-th sector of the 2,002-th track indicates that this directory is continuous to the first sector of the 2,002-th track. In correspondence with this, data of (2,202/0) continuous to "FF" showing continuous data is recorded at the beginning of the first sector of the 2,002-th track, and data continuous to the 0-th sector of the 2,002-th track is recorded. In addition, data larger than Ttotal (, which is 10,001 in this example) is recorded in order to indicate that all directories have been completed.

While the file management method according to this invention has been described in connection with an optical card on which tracks are linearly formed, this invention is not limited to the application to such an optical card, but is also applicable to cards having tracks of various shapes. For example, this invention is similarly applicable to a disk-shaped optical card on which circular tracks are formed.

In summary, data recording method for an optical card and data reproducing method therefor in accordance with this invention are such that when an alteration or a change occurs in the directory, a new directory is written to record at all times the directory pointer indicating the position of the newest directory, with the result that file management can be easily conducted.

Utilizability in industry

A data recording and reproducing method for an optical card according to this invention can be widely utilized as a general format for optical cards. Since optical cards recorded in accordance with the format of this invention sufficiently permits file management, they can be widely utilized for data storage units for computer, image data storage units for video systems, and terminal processors for credit cards, etc.

What is claimed is:

1. A data recording method for an optical card on which a plurality of tracks are formed, said method comprising the steps of:
    defining a first guide section at an end of a track, a second guide section at an other end of said track, an ID section between said guide sections adjacent said first guide section, an end section between said guide sections adjacent said second guide section, and a record section at an intermediate portion between said ID section and said end section;
    preparing a record data to be recorded and reproduced, an ID data which contains information to identify a track, and a termination data which indicates that said record data is terminated; and
    storing said record data in said record section, said ID data in said ID section, and said termination data in said end section.

2. The method of claim 1, wherein the same ID data are repeatedly recorded several times in said ID section.

3. A data recording method for an optical card on which a plurality of tracks are formed, said method comprising the steps of:
    preparing a record data comprised of a series of data bits;
    dividing said record data into a plurality of groups comprised of a predetermined number of bits;
    producing error correcting codes for said respective groups;
    adding said correcting codes to said respective groups to constitute unit data blocks; and
    extracting a unit data block from said unit data blocks one by one according to a predetermined order and in sequence storing the extracted block in said tracks.

4. The method of claim 3, wherein said error correcting code is added using a difference set cyclic code method.

5. A data recording method for an optical card on which a plurality of tracks are formed, said method sequentially comprising the steps of:
    (a) defining on said optical card at least three areas comprising a directory pointer area, a directory area, and a data area;
    (b) writing data labelled a predetermined file name onto an unrecorded track of said data area;
    (c) writing a number of a track onto which writing has been conducted in step (b) onto an unrecorded track of said directory area together with said file name thereof; and
    (d) writing, as a directory pointer, a number of a track onto which writing has been conducted in step (c) onto an unrecorded portion on tracks of said directory pointer area.

6. The method of claim 5, wherein a memory is prepared, data which is to be written in step (c) and step (d) is temporarily stored in said memory, and said data stored in said memory is transferred to said optical card after step (b) has been conducted a plurality of times.

7. The method of claim 5, wherein a track number is written into a portion succeeding a lastly recorded portion in said directory pointer area in step (d).

8. The method of claim 5, wherein only a number of a first track of an area in which writing has been conducted in step (c) is written in step (d).

9. The method of claim 5, wherein a card ID area is defined as a fourth area on said optical card, and arrangement information of said directory area, said directory pointer area and said data area is recorded in said fourth area.

10. A data reproducing method for an optical card on which a plurality of tracks are formed, said method comprising the steps of:
    (a) recognizing three areas of a directory pointer area, a directory area, and a data area, which are defined on said optical card;
    (b) reading a track number recorded as a directory pointer in said directory pointer area;
    (c) reading a track in said directory area corresponding to said track number having been read in step (b), thus obtaining information having been read; and
    (d) reading data in said data area on the basis of said information.

11. The method of claim 10, wherein a memory is prepared, information which is to be read in step (c) is once transferred to said memory, and then said information is utilized in step (d).

12. The method of claim 10, wherein only a track number lastly recorded in said directory pointer area is recognized in step (b) and information is obtained from tracks beginning with a track corresponding to said recognized track number in step (c).

13. The method of claim 10, wherein positional recognition of said directory area, said directory pointer area, and said data area is carried out on the basis of an arrangement information having been read from a card ID area defined on said optical card.

* * * * *